April 18, 1967 B. L. BRUCKEN ETAL 3,314,385
WASTE INCINERATOR
Filed Sept. 28, 1964 8 Sheets-Sheet 1
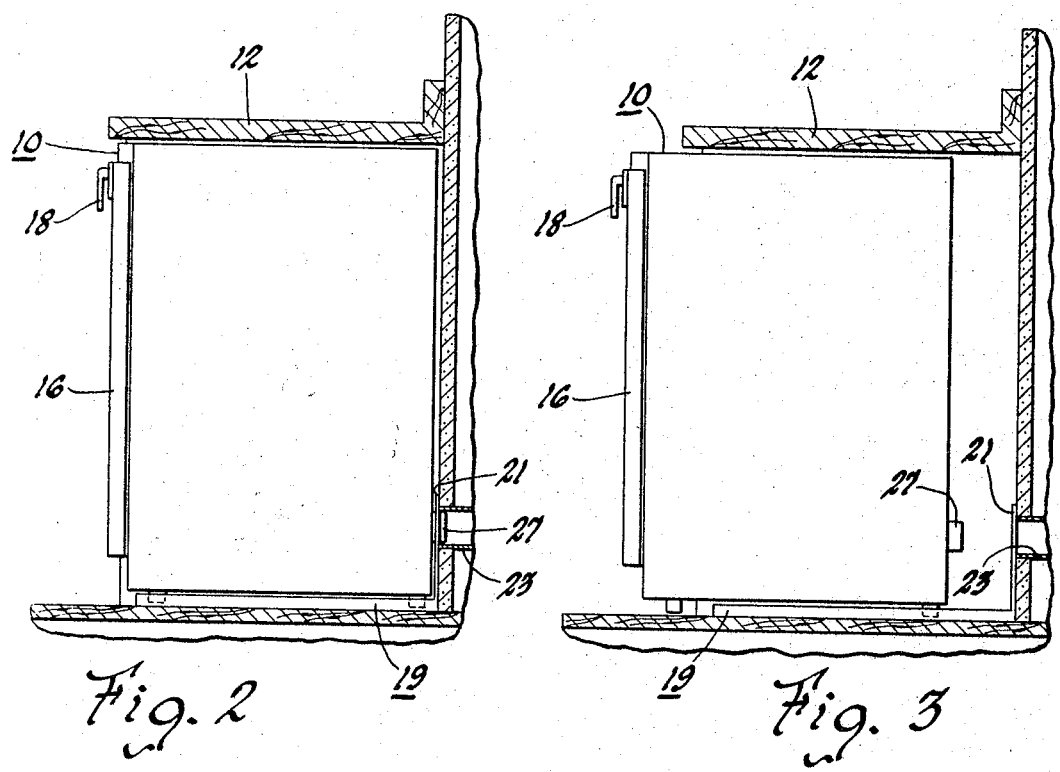
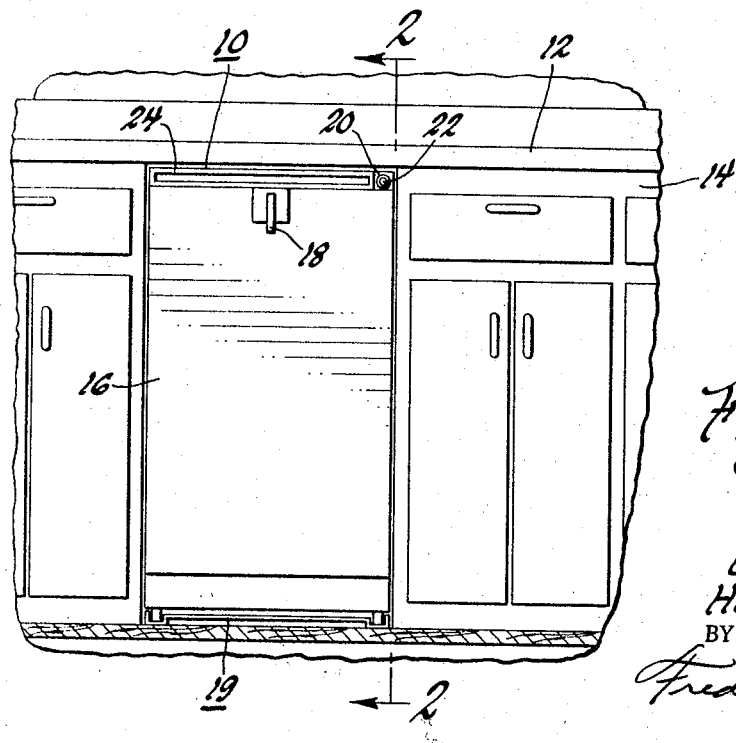
INVENTORS
Byron L. Brucken
Harold P. Cassady
BY
Frederick M. Ritchie
THEIR ATTORNEY

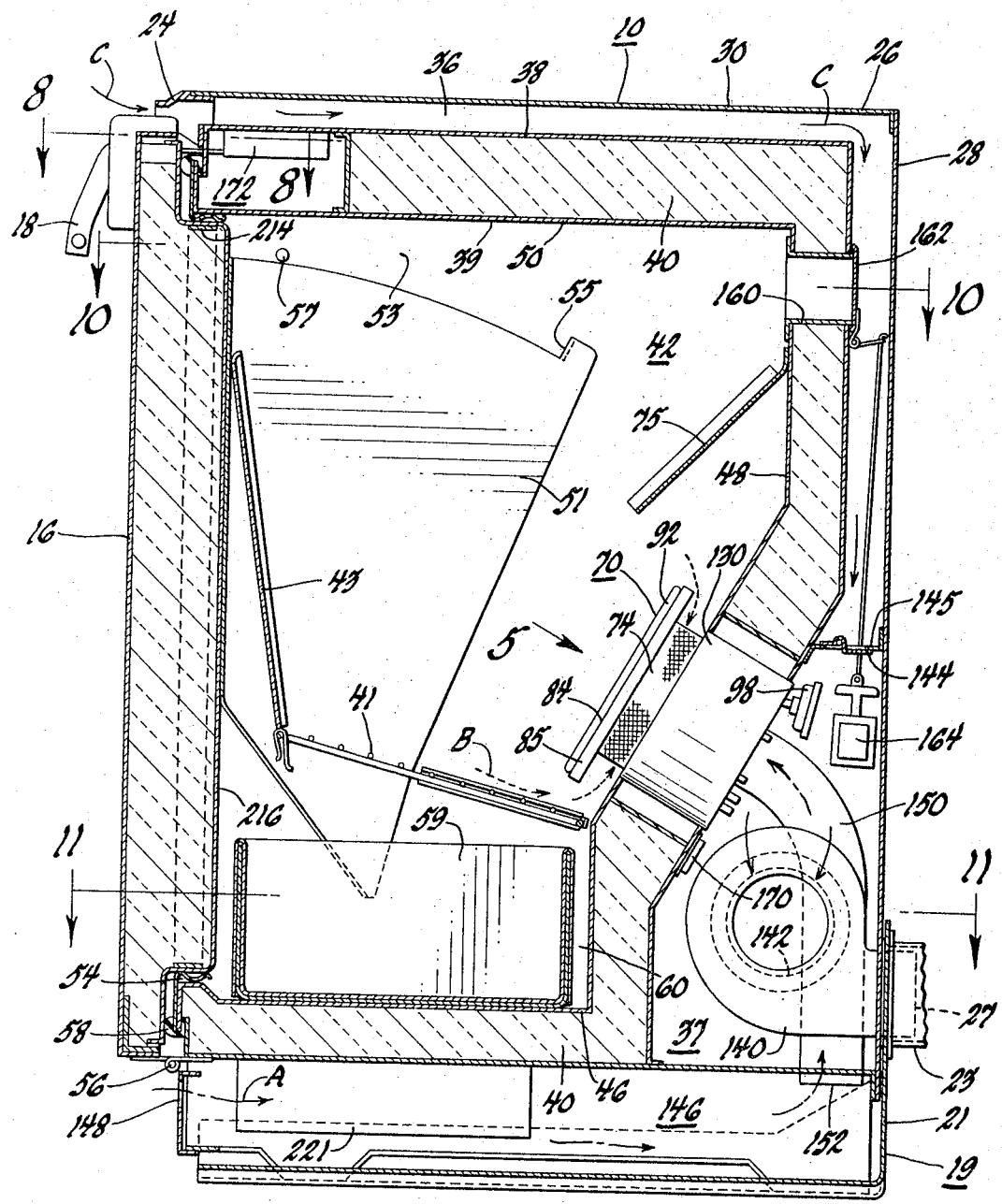

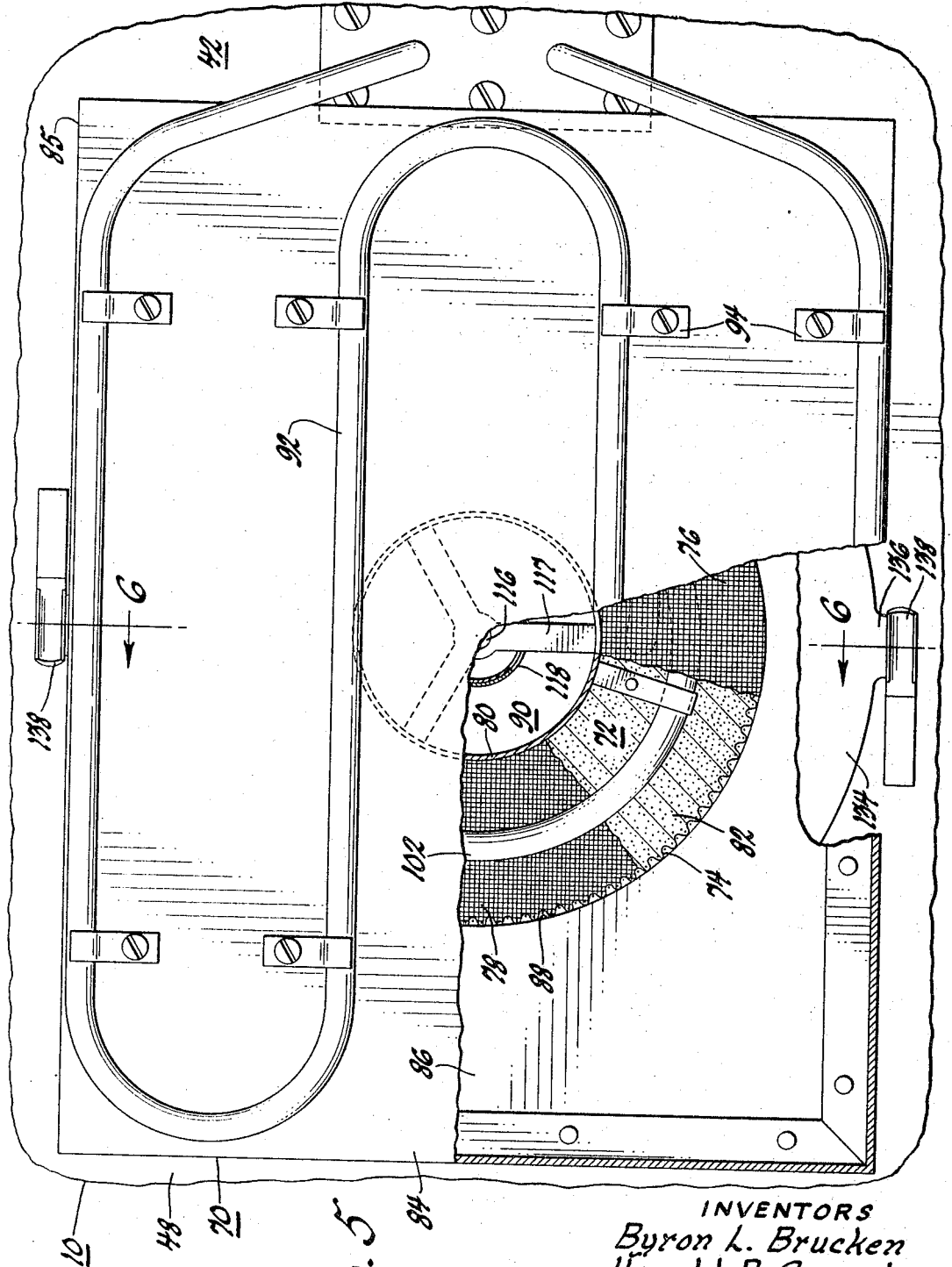

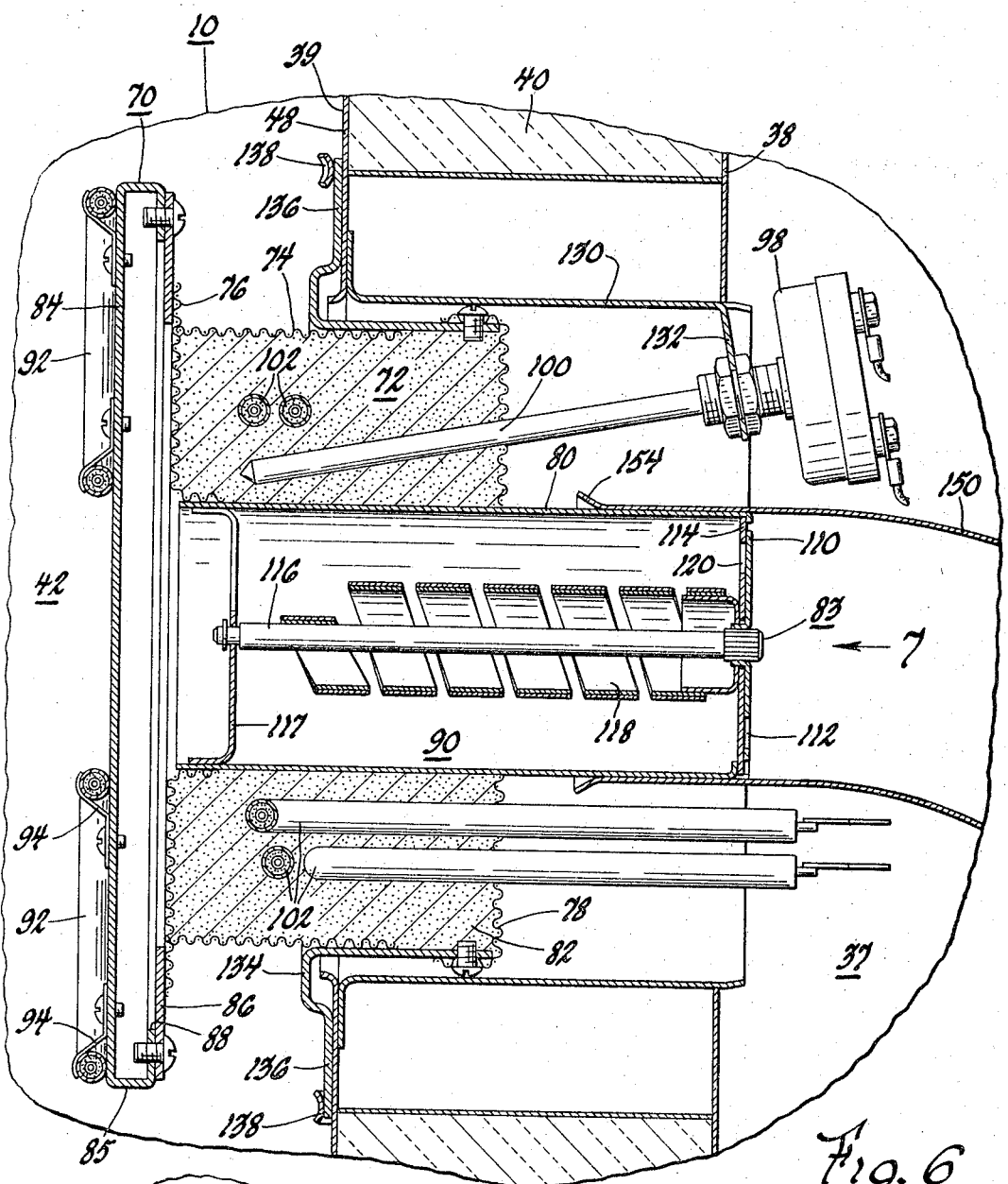

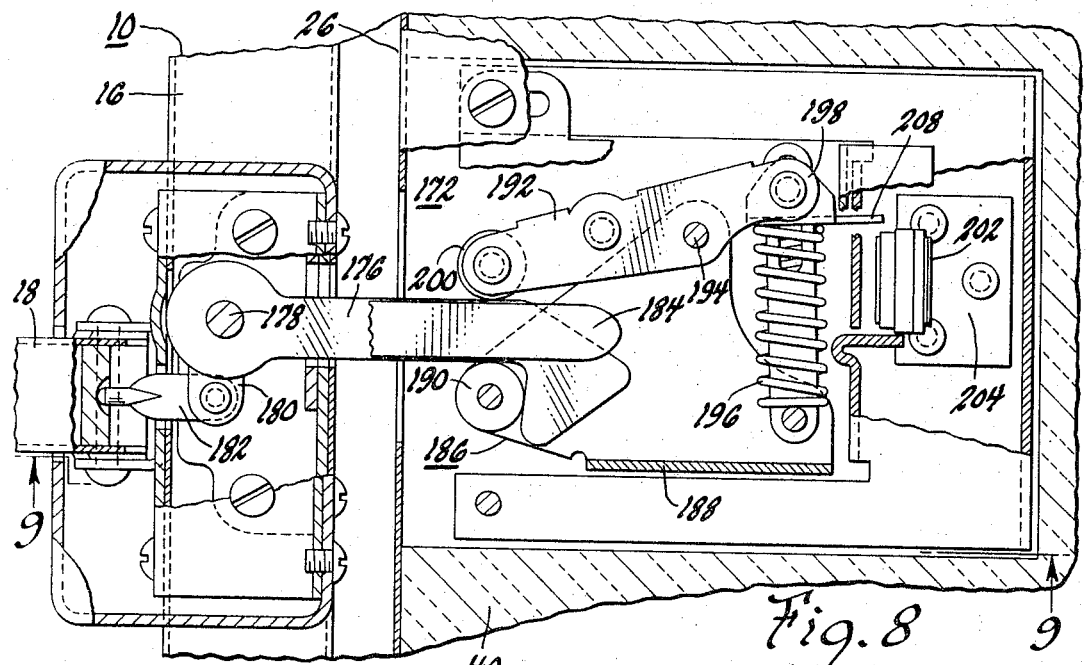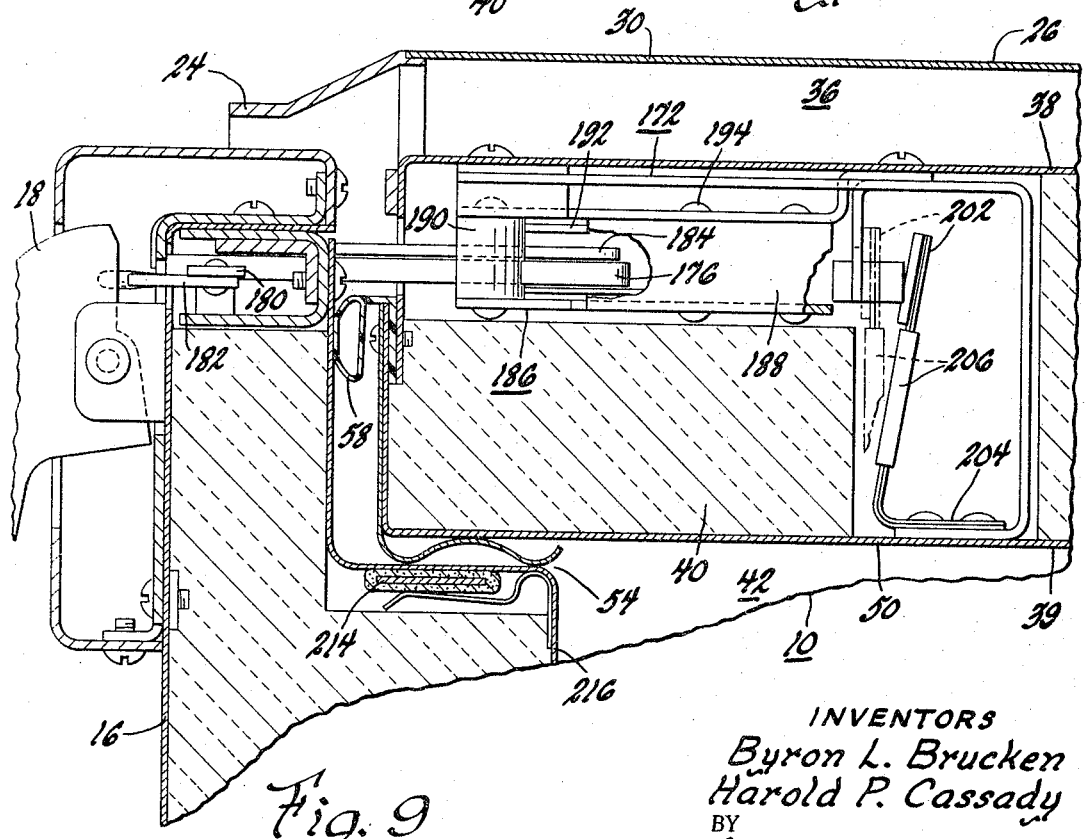

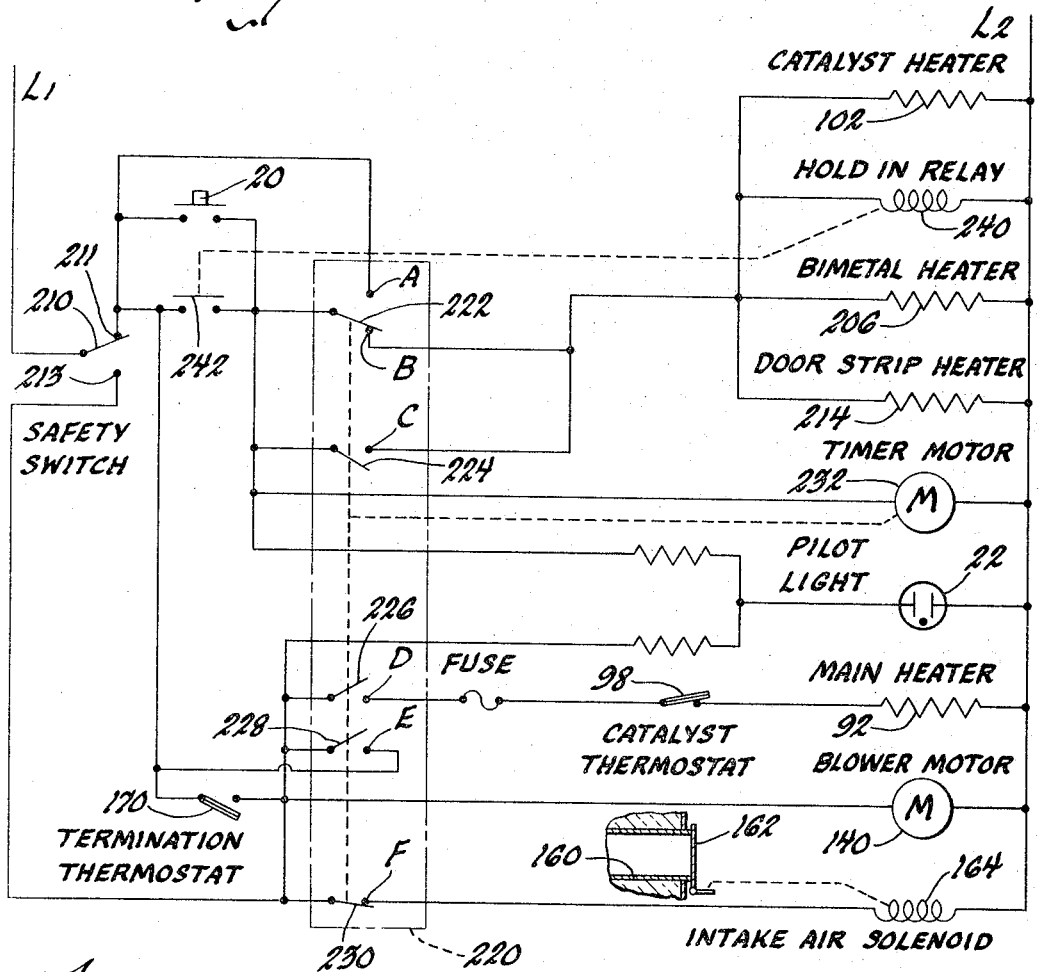

INVENTORS
Byron L. Brucken
Harold P. Cassady
BY
Frederick M. Ritchie
THEIR ATTORNEY United States Patent Office 3,314,385
Patented Apr. 18, 1967

3,314,385
WASTE INCINERATOR
Byron L. Brucken and Harold P. Cassady, Dayton, Ohio, assignors to General Motors Corporation, Detroit, Mich., a corporation of Delaware
Filed Sept. 28, 1964, Ser. No. 399,733
16 Claims. (Cl. 110—8)

This invention relates to a domestic appliance and more particularly to an improved waste incinerator of the type taught in co-pending application S.N. 848,465, filed October 23, 1959 and assigned to the same assignee as this invention, now Patent 3,150,619 granted September 29, 1964.

With the ever growing trend of prepackaging foodstuffs, packaging consumer items, reading matter and miscellaneous refuse, the disposal of household waste and trash has become a major problem to the housewife; indeed, the waste collection agencies are severely taxed to cope with the growing trash situation. Both gas and electrically heated household incinerators have been available for several years as a means of reducing waste with the effluent being discharged through the chimney flue. The presently marketed incinerators, however, have had very limited acceptance for the following reasons. Uncontrolled combustion of the waste results in the generation and emission of smoke and disagreeable odor and creates cabinet temperatures which are unacceptable to U.L. standards for installation in a habitable area such as a kitchen. High effluent temperatures have required venting into a class A ceramic lined flue and thus the general appearance and temperature characteristics of the prior art incinerators have limited their use to an area remote from the kitchen.

In the co-pending application cited hereinbefore, a waste disposer or incinerator has been taught wherein a novel destructive distillation process in the absence of air has been provided with a dilution air exhaust system to overcome the deficiencies of the prior art devices in a manner to make this new appliance acceptable for installation in a kitchen. This invention is directed to an improved incinerator of the type taught in the co-pending application.

Accordingly, an object of this invention is the provision of an improved incinerator utilizing a destructive distillation process.

A more specific object of this invention is the provision of an incinerator having an improved automatic incinerating cycle including a destructive distillation portion at the beginning thereof for reducing waste to a carbonaceous residue and a second carbon burning portion for reducing the carbonaceous residue to an ash.

A further object of this invention is the provision of an incinerator with means for inducing a sweep of air through the door opening when the door is opened thereby to prevent sooty contaminants from entering the room while the incinerator is being loaded.

A further object of this invention is the provision of a heating means at the jointure of the door with the door opening for minimizing condensation.

A still further object of this invention is the provision of a common catalyst means for eliminating both smoke and odor and free oxygen from the destructive distillation chamber of the incinerator.

Another object of this invention is the provision of improved means for removing and disposing of ash residue from the destructive distillation and carbon burning portions of the automatic incinerating cycle.

A still further object of this invention is the provision of improved means for effecting the installation of a waste incinerator whereby the incinerator is adapted, by the slidable positioning thereof in a line of base cabinets, for connection to an exterior exhaust duct and a power supply receptacle.

Another object of this invention is the provision of improved forced air cooling means in the incinerator for minimizing the exterior wall temperatures thereof.

Further objects and advantages of the present invention will be apparent from the following description, reference being had to the accompanying drawings wherein preferred embodiments of the present invention are clearly shown.

In the drawings:

FIGURE 1 is a fragmentary front elevational view of the improved incinerator installed in a line of kitchen base cabinets;

FIGURE 2 is a side sectional view, partly in elevation, taken along line 2—2 in FIGURE 1 showing the incinerator in its installed position;

FIGURE 3 is a side sectional view, partly in elevation, taken along line 2—2 in FIGURE 1 showing the incinerator in a partially slidably removed position;

FIGURE 4 is a side sectional view, partly in elevation, taken along line 4—4 in FIGURE 11;

FIGURE 5 is a fragmentary elevational view of the catalytic oxidizing assembly taken in the direction of line 5 in FIGURE 4 and with parts broken away to show the construction thereof;

FIGURE 6 is a fragmentary sectional view, partly in elevation, taken along line 6—6 in FIGURE 5;

FIGURE 7 is a fragmentary sectional view, partly in elevation, taken along line 7 in FIGURE 6;

FIGURE 8 is a fragmentary sectional view, partly in elevation, taken along line 8—8 in FIGURE 4 and showing the thermally responsive door latch mechanism for the incinerator;

FIGURE 9 is a fragmentary sectional view, partly in elevation, taken along line 9—9 in FIGURE 8;

FIGURE 12 is a schematic wiring diagram of the improved control system for operating the incinerator of this invention;

FIGURE 13 is a timer cycle chart representative of the sequencing available with the wiring diagram of FIGURE 12;

Figure 10:
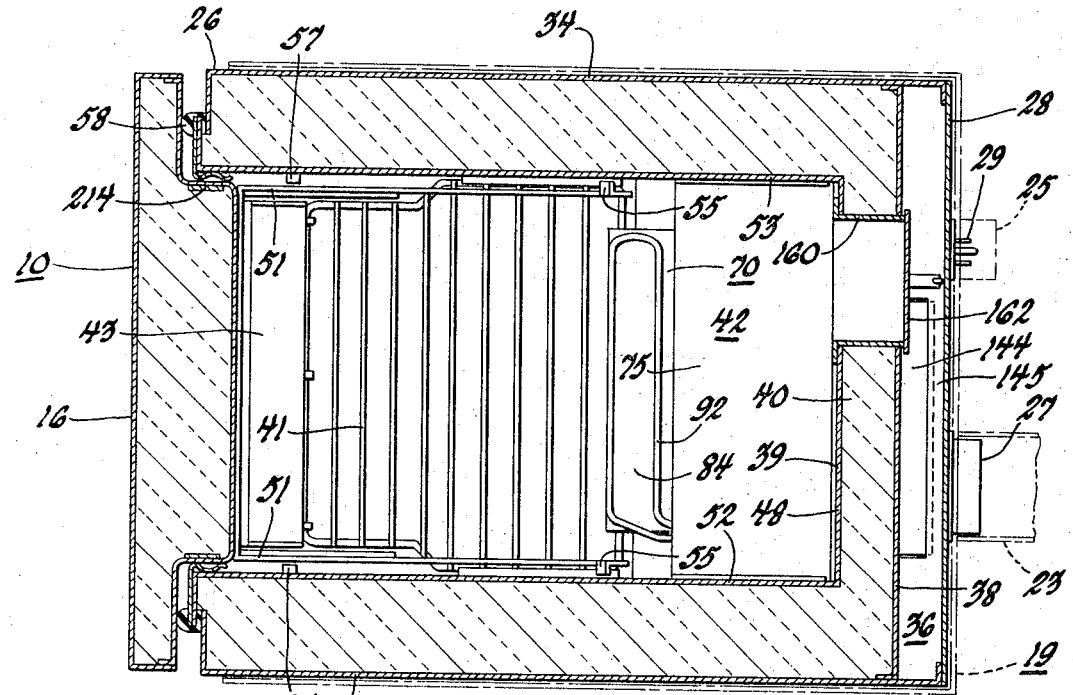
FIGURE 10 is a top sectional view, partly in elevation, taken along line 10—10 in FIGURE 4.

Briefly, the waste incinerator here taught utilizes a controlled process, firstly, of destructive decomposition by heat in the absence of air with heat initiated by electric means to vaporize the moisture and other volatiles of the charge. Subsequently, and in accordance with one of the improvements of this invention, the introduction of a controlled amount of air to the incinerator decomposes, as by a combustion process, the carbonaceous residue remaining after the destructive decomposition.

To eliminate the smoke and odor of the effluent, a catalytic oxidizer is used to effectively convert the effluent by catalytic action to odorless $CO_2$ and moisture, exhaustible in the form of gaseous products of combustion to the atmosphere. Further, so that the incinerator may be installed in a habitable area adjacent to combustible materials such as kitchen base cabinets, the temperature of the exhaust gas from the incinerator is held to within acceptable limits, 150° F. or lower, by introducing ambient air into the exhaust gases down stream from the oxidizing catalyst, thereby diluting the high temperature exhaust gas with air at room temperature.

In accordance with this invention and with reference to FIGURES 1–3, an incinerator 10 is adapted to be installed beneath a counter top 12 and interposed in a line of base cabinets 14. The incinerator is adapted to be front loading and includes an insulated loading door 16 which is hinged at the bottom and adapted to be opened by a handle 18 in one portion thereof. A combination start button 20 and pilot light 22 is positioned at one side of an air inlet escutcheon 24 above the access door 16. The button may be pushed to initiate an automatic waste incinerating cycle, as will be described more fully hereinafter.

According to one aspect of this invention, simple plug-in disconnects for both the vent system and electrical systems are provided. The incinerator 10 is adapted to be conditioned for operation simply by the sliding thereof into place in a line of base cabinets. This feature is facilitated by an L-shaped pan-like installation base 19 adapted to be attached to the floor before slidingly receiving the incinerator. The base 19 has an upstanding rear wall 21 including an exterior duct adaptor fitting 23 and an electrical power supply receptacle 25 (FIGURE 10). Mating with these, when the incinerator is slid in place, are an insertable exhaust outlet stub 27 for a blower and an electrical plug 29 (FIGURE 11) on the back of the incinerator.

Figure 11:
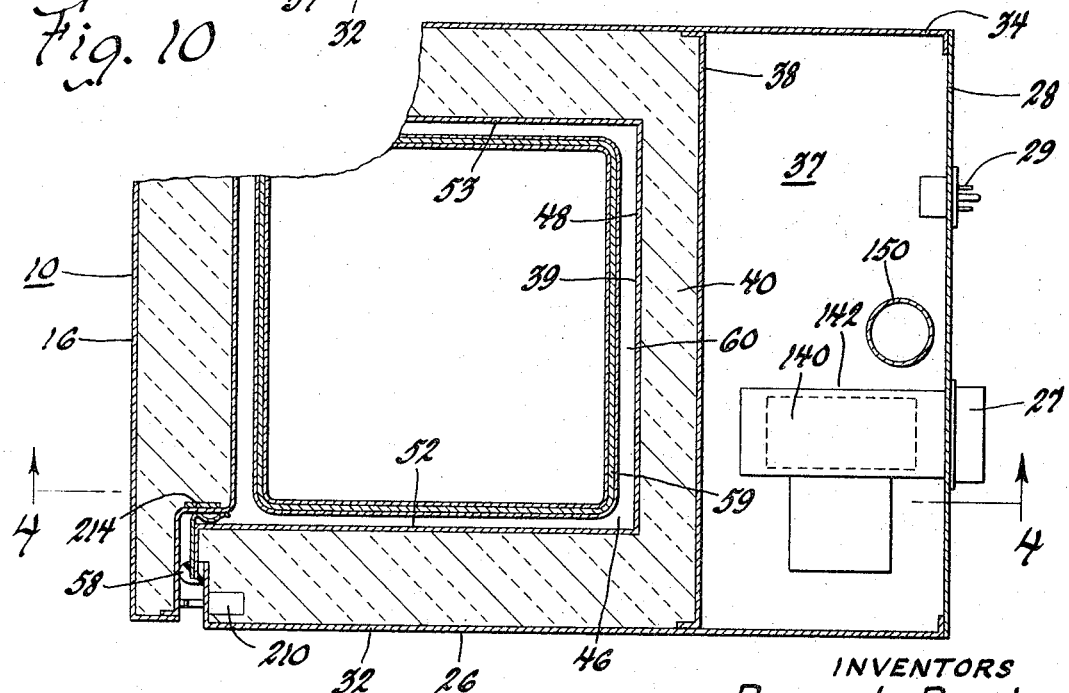
FIGURE 11 is a fragmentary top sectional view, partly in elevation, taken along line 11—11 in FIGURE 4.

Reference may now be had to FIGURES 4, 10 and 11 for a complete disclosure of the structural aspects of the incinerator 10. The incinerator 10 is defined at its outer limits by a sheet metal casing 26 having a rear wall 28 and a top wall 30. Sidewalls 32, 34 serve as the side outer limits of the appliance which may abut adjacent cabinetry. An intermediate wrapper 38 is spaced from the top and rear walls of the incinerator to form therewith an air passageway 36, coextensive with the top wall 30 and an upper portion of the rear wall 28, and a blower compartment or exhaust mixing chamber 37. This wrapper serves also as a retainer for insulation 40 along the top and back thereof—the insulation extending also adjacent the sides and bottom of the incinerator to form with a metallic box-like shell 39 an air-tight destructive distillation chamber 42 having a grate 41 and a pivotable load guide panel 43. The distillation chamber 42 is defined by a bottom wall 46, a rear wall 48, a top wall 50, and sidewalls 52, 53 and includes an access opening 54 at the front thereof. The opening is closed by a plug portion 216 on the inner side of the access door 16 which is mounted at 56 for horizontally pivotal movement between fully open, partially open and closed positions. The door has side panels 51 attached to the plug portion thereof, each panel having an outwardly turned flange 55 which hits against a stop 57 to hold the door in a tilted or partially open position—the door and the side panels forming with the pivotable guide panel 43 a chute for loading waste into the chamber 42. It is important to note that the distillation chamber 42 is substantially airtight and for this reason a heat resistant seal 58 circumscribes the access opening to effect an airtight seal between the door 16 and the casing 26.

The back wall of the distillation chamber 42 is slanted toward an ash collecting portion 60 of the chamber which includes a removable ash collecting box 59. To provide for removal of the box 59, the side panels 51 on the door are manually bent inwardly to clear the stops 57 so the door may lower to a position wherein the handle 18 rests on the floor. This places the box within easy reach. For cleanliness the box 59 may be formed of folded aluminum foil having closable top flaps—the whole box being disposable along with its contents. It is in the chamber 42 including the lower portion 60 that sufficiently high temperatures are generated to incinerate by means of a combined destructive distillation and carbon burning cycle.

Removably attached to the rear of the destructive distillation chamber 42 is a catalytic oxidizing assembly 70 which includes a combustion chamber 72 defined by a cylindrical screen 74, top and bottom annular screens 76 and 78 and, in the center thereof, a metal cylinder 80 forming an oxidizing air inlet duct 90. The pervious combustion chamber 72 contains a quantity of alumina pellets 82 coated with a catalytic agent. The pellets have proved superior to the catalyst screens of the copending application in that more surface area is exposed to the exhaust gases in a smaller space and their cost is less. Since the combustion chamber 72 is in communication with the destructive distillation chamber 42 through the perforations of the cylinder screen 74, the effluent smoke and odor from the chamber 42 is converted or altered to odorless $CO_2$ and moisture by the catalytic action of the activated pellets. The catalytic oxidizing assembly 70 includes an imperforate rectangular plate 84 folded over about its periphery 85 to receive a bottom plate 86 having an opening 88 for placing the combustion chamber 72 in communication with the oxidizing air inlet duct 90.

For initiating and controlling the rate of destructive distillation within the chamber 42 the assembly 70 has a 1200 watt heating element 92 supported on plate 84 by brackets 94.

To be effective the temperature of the catalyst 82 must be maintained within the range of 800° to 1400° F. Such control is provided in the assembly 70 by a catalyst thermostat 98 in the circuit with the main heater 92. The thermostat 98 includes a probe 100 buried in the catalyst pellets 82 in a manner to be responsive to the composite of temperatures existing in the destructive distillation chamber 42 and the combustion chamber 72. Since the heater 92 determines the rate at which destructive distillation occurs, this heater also helps to determine the temperature of the catalyst 82. Even though the temperature of the catalyst beads, during an incinerating cycle, is determined by the temperature of the destructive distillation chamber 42 (reflected by the temperature of the effluent therefrom) and by the temperature generated by the catalytic oxidation in the combustion chamber 72, note that catalyst heater 102 is buried in the catalyst 82 for activating the catalyst at the beginning of the incinerating cycle when the incinerator is still cool. This will be understood more fully hereinafter in connection with the description of an operating cycle.

Also included in the catalytic oxidizing assembly 70 is an air flow control means 83 operable, first, for allowing the catalyst to come up to an activated temperature of 1200° F. by preventing air flow therethrough at the beginning of an incinerating cycle and, second, for metering the oxidizing air through the duct 90 and the screen 76 to the combustion chamber 72 for oxidizing the smoke and odor. More particularly, a rotary damper or valve 110 having an opening 112 lays in juxtaposition to a closure member 114 fixed at one end of the oxidizing air duct 90. The shutter or damper 110 is connected through a shaft 116 journalled on a spider 117 to a spirally wound thermostatic bimetal element or oxidation air thermostat 118 which senses the temperature of the air in duct 90 and opens the valve when the catalyst temperature increases to approximately 1200° F. Thereafter the valve modulates air flow to maintain the maximum catalyst temperature during oxidation by metering air at about 5 c.f.m. through the duct 90 to the combustion chamber 72. With an increase in temperature valve port 112 tends to align with a port 120 in the closure member 114.

Extending rearwardly from the rear wall 48 of the distillation chamber is a cylindrical housing 130 for receiving the catalytic oxidizing assembly 70 and having a turned over tab 132 for supporting the catalyst thermostat 98. For attachment to the wall 48, the catalytic oxidizing assembly 70 includes an annular support collar 134 with four radially extending tangs 136 which slip under respective wall brackets 138 when the assembly 70 is rotated relatively thereto. An ash baffle 75 extends across the chamber 42 over the assembly 70 to prevent the screen 74 from being clogged with debris. Thus installed, effluent such as smoke and odor enters the combustion chamber 72 through the screen 74 and is oxidized to colorless and odorless products—these products leaving the area of the catalytic oxidizing assembly by way of the housing 130 therefor which opens into the blower chamber or plenum 37.

The air circulation system which induces smoke and odor from the destructive distillation chamber 42 and which exhausts and dilutes the oxidized products of combustion will now be described with reference to FIGURES 4 and 6.

A motor operated blower 140 is supported in the exhaust mixing chamber 37 on the rear wall 28 of the incinerator with its outlet 27 inserted into the base duct fitting 23. The blower includes an inlet 142 which, by means of the closed plenum 37, is in communication with the ambient cooling air passageway 36 through a barometric damper 144 in a partition 145 and in communication with the combustion chamber 72 of the catalytic oxidizing assembly via the assembly housing 130.

Oxidation air, required in the combustion chamber 72 to convert the smoke and odor, enters a control compartment 146 across the bottom of the incinerator through an opening 148 at the front thereof in communication with the atmosphere. The control compartment 146 is essentially closed off from the blower compartment 37 and is in communication with the blower only through a duct 150 having an inlet end 152 in communication with the control compartment 146 and a flared outlet end 154 (FIGURE 6) snugly overfitting the oxidation air duct 80 in the catalytic oxidizing assembly. Thus, with the blower 140 in operation, oxidation air (arrows A) is drawn in through the control compartment 146 where it is preheated on its way to the combustion chamber 72 by the thermal transfer from the destructive distillation chamber 42. In the combustion chamber the oxidation air oxidizes the effluent or generated vapor and gases (arrows B) in the presence of the catalyst pellets 82 with the resultant high temperature products of combustion being drawn into the blower chamber through the housing 130.

The ambient cooling air (arrows C), amounting to approximately 85 c.f.m. is drawn through the inlet escutcheon 24 at the front of the incinerator, the cooling air passageway 36 across the top and back of the incinerator and the barometric damper 144 into the blower compartment 37 where the cooling air mixes with the high temperature (800°–1400° F.) oxidized products of combustion to cool the mixture to a temperature (100°–120° F.) suitable for exhausting to the atmosphere through the duct 23.

The foregoing ambient cooling air (arrows C), the generated vapor and gases (arrows B), and the heated oxidation air (arrows A) represent the various circulating systems in operation during the destructive distillation portion of the incinerating cycle. In accordance with this invention, the incinerating cycle includes a terminal portion known as the carbon burning cycle during which an additional air circulating system comes into play. More particularly, the rear wall 48 of the destructive distillation chamber 42 is provided with a duct 160 having a damper 162 over one end thereof and openable by an intake air solenoid 164 to place the chamber 42 in communication with the inlet air passageway 36. Thus, when the solenoid 164 is energized and the damper 162 is opened, a portion of the air circulating through the passageway 36 is diverted through the destructive distillation chamber 42 to provide the oxidation air to support a combustion of the carbonaceous residue remaining in the chamber 42. The air circulated through the chamber 42 during the carbon burning cycle leaves the chamber in the same manner as did the smoke and other effluents during the destructive distillation process, i.e. through the oxidation pellets in the combustion chamber 72 from which the blower 140 is effective to exhaust the oxidized products of combustion.

In general the total cycle including both the destructive distillation portion and carbon burning portion is terminated automatically by a termination thermostat 170 in the exhaust mixing chamber or blower housing 37 which closes above 135° F. to condition the blower for termination and opens below 135° F. to stop the blower and terminate the cycle. The operation of the termination thermostat 170 will be understood more fully hereinafter in accordance with the description of an operating cycle.

Various safety controls have been incorporated into the waste disposer 10 in order to provide for the safe operation thereof. For instance, a door interlock switch 210 (FIGURE 11) prevents the cycle from being initiated until the door is closed; and a door safety latch mechanism 172 prevents the opening of the door after initiation of the cycle until the temperatures in the destructive distillation chamber have reduced to a safe level. Another safety is provided by the aforementioned barometric air damper 144 which maintains controlled air flow to the blower 140 and seals off the blower chamber in case of power failure.

Turning now to FIGURES 8 and 9, the door safety latch mechanism 172 will be described more fully. In addition to the latch handle 18, the latching assembly includes on the door 16 a bolt 176 pivoted about a point 178 through an affixed link 180 connected to the handle 18 through another link 182. A guide or antiside thrust device 184 extends rearwardly from the inner panel of the door 16 above the bolt 176 and operates to counterbalance the forces exerted by the movement of the bolt 176 when it is pivoted against the keeper portion shown generally at 186.

The keeper portion 186 is installed on the incinerator casing at the top thereof and includes a bracket 188 having a stationary stop 190 and a pivotable lock arm 192 pivotable about a point 194. A spring 196 operates on the inner end 198 of the lock arm 192 to cause a roller 200 to bear against one side of the bolt 176. Thus, when the handle 18 is lifted, the bolt 176 is caused to rotate counterclockwise and the lock arm 192 pivots clockwise to release the bolt from the stop portion 190.

For safety the latch mechanism 172 should be immobilized so that the door cannot be opened when the temperatures in the destructive distillation chamber 42 are dangerously high, such as above 500° F. This feature is accomplished through a bimetal strip 202 fastened at 204 to the top wall 50 of the chamber 42 and in thermal heat exchange relation therewith. A bimetal heater 206 wrapped around the metal 202 serves to warp the bimetal into a blocking position (phantom line FIGURE 9) with an extending tang 208 on the lock arm 192. With the bimetal in the phantom line position, the lock arm 192 cannot be pivoted clockwise and thus the bolt 176 cannot be disengaged from the stop 190.

OPERATION

An operation is initiated when a load of waste material is placed on the grate 41 in the bottom of the destructive distillation chamber 42 and electrically heated in the absence of air at a temperature of about 800° F. as taught more fully in the co-pending application. Combustible gases are evolved from the waste along with smoke, odor and moisture and these products are passed through the catalytic oxidizing chamber 72 where they are completely burned rendering them substantially odorless and smokeless. In order to minimize condensation around the door 16 at the start of the incinerating cycle, a door strip heater 214 circumscribes the inwardly projecting plug portion 216 of the door. Subsequently, the oxidized products are mixed with large quantities of ambient air in the blower chamber so that the discharged gases from the incinerator never exceed 150° F.

Following the destructive distillation portion of the incinerating cycle, the remaining carbonaceous residue is then reduced to ash in a carbon burning cycle by admission of air to the chamber 42 through the damper 162.

In general the incinerating cycle is partially controlled by a timer 220 in the control box 221 which has a plurality of cam actuated switches 222, 224, 226, 228 and 230 operated in conjunction with respective timer contacts A, B, C, D, E and F by a timer motor 232 in accordance with the timer cycle chart of FIGURE 13. The door switch 210 will engage a contact 211 when the door is closed and a contact 213 when the door is open—this latter position serving to energize the blower 140 and the intake air solenoid 164 to effect a sweep of air inwardly through the open door to prevent dust from entering the room.

The cycle is initiated after loading the waste into the chamber 42 by depressing the start button 20 in a holding circuit. This initiates the cycle through the timer contact B by energizing a 450 watt catalyst heater 102 to preheat the catalyst so that no smoke and odor will escape to the outside at the beginning of the incinerating cycle. The hold-in relay 240 will be energized to close switch 242 for supplying power to the timer motor at least for the first ten minutes of the incinerating cycle until A is closed. The bimetal heater 206 will be energized so that two minutes after the energization thereof the bimetal 202 will have warped into blocking engagement with the latching mechanism so that the door cannot be opened, and the door strip heater 214 is energized to prevent condensation at the start of the cycle.

Ten minutes after the initiation of the cycle the timer contacts D and E are closed to energize the 1200 watt main heater 92 and the exhaust blower 140—the termination thermostat 170 closing as soon as temperatures in the chamber 37 exceed 135° F. to complete a termination circuit with the exhaust blower and heater. The blower mixes the gases of combustion with air so that the discharged gases from the incinerator never exceed 150° F. at the blower outlet 27. Note that the bimetal latch lock 202 now receives heat from the chamber 42 as well as from its heater 206. After thirty-five minutes C opens to deenergize the catalyst heater 102 and the bimetal heater 206, since the catalyst 82 and the bimetal 202 are now self-sustaining. The hold-in relay is deenergized, since the timer is now controlled through A and the door strip heater 214 is disconnected in view of the existing high temperatures in the chamber 42.

The main heater 92 is controlled by the catalyst thermostat 98 which senses the oxidation temperature of the effluent (affected also by the adjacent temperatures of the destructive distillation chamber 42) and in turn controls the distillation rate of the waste. The distillation portion of the incinerating cycle lasts for three hours during which time the waste is reduced to a carbonaceous residue. The rotary valve 110 in the inlet duct to the catalyst or combustion chamber is operated by the bimetal 118 which senses air temperature in a manner to cause the valve to pass just enough air to sustain oxidation in the combustion chamber 72. More particularly, the valve remains closed until the catalyst temperature reaches 500° F. After this the damper 110 modulates air to the catalyst for combustion.

After three hours the timer contact F closes to energize the intake air solenoid 164 and open the valve 162 to admit a controlled amount of air into the chamber 42 to reduce the carbonaceous residue to ash. Simultaneously therewith contact E opens thereby to place the continued energization of the blower 140, the heater 92 and the intake air solenoid 164 under the control of the termination thermostat 170.

After four hours, which completes the timer portion of the cycle, the timer contact D opens to deenergize the main heater 92 and the cycle starts toward termination with the termination thermostat 170 in exclusive control of the cycle until the termination thermostat cools to 135° F. and deenergizes the blower 140 and intake air solenoid 164.

After the cycle the door 16 may be opened for subsequent use when the bimetal lock device 202 returns to its cooled position by reason of the temperature in the chamber 42 decreasing.

Figure 14:
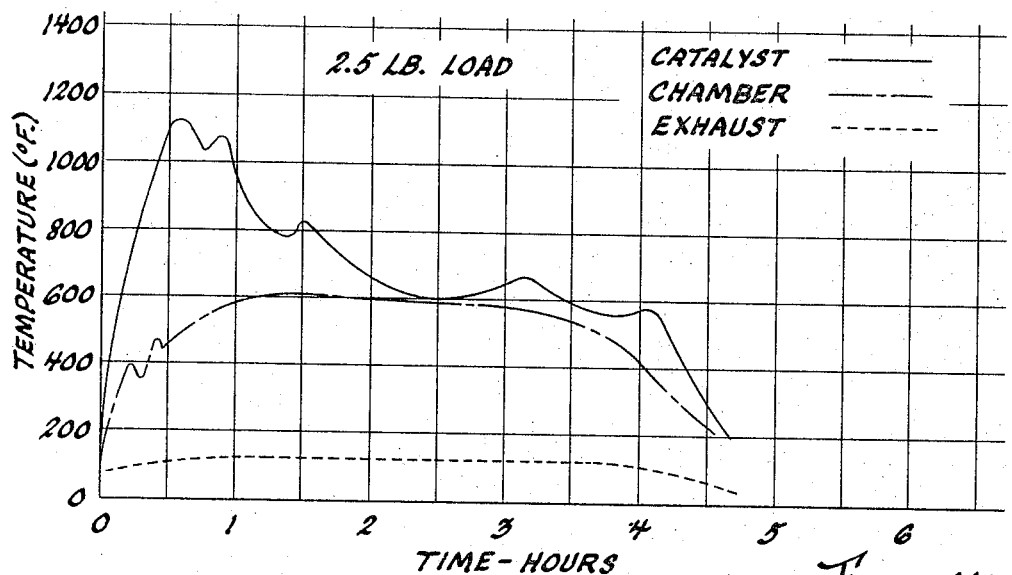
FIGURE 14 is a graphic representation (temperature vs. time) of a waste incinerating cycle for a 2½ pound load of waste.
Figure 15:
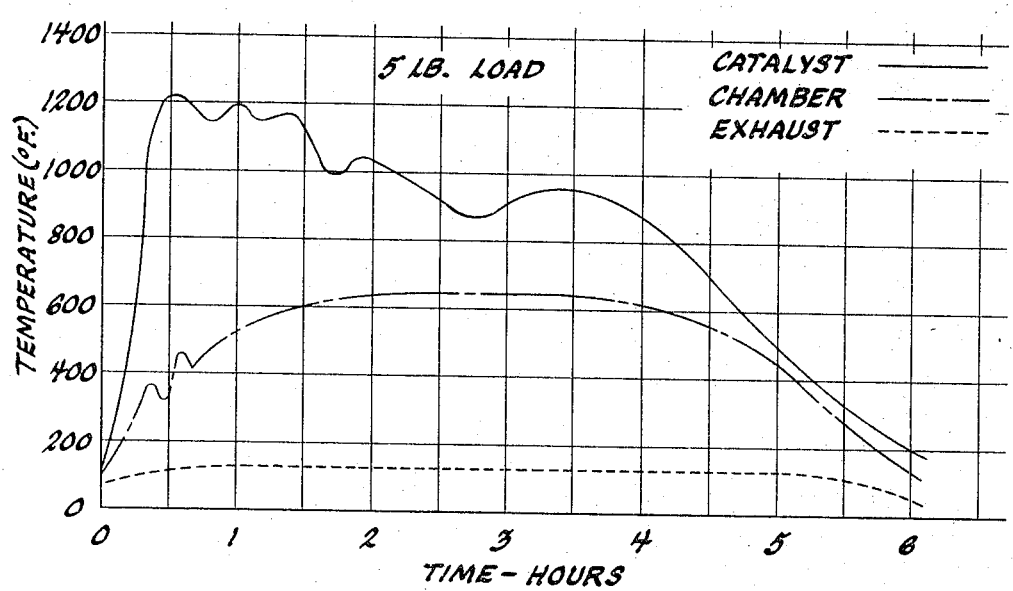
FIGURE 15 is a graphic representation similar to FIGURE 14 for a 5 pound load of waste.

One suitable incinerator for accomplishing the disclosed incinerating cycle may have the following dimensions: height, 34½ inches; width, 18 inches; and depth, 25 inches. The electrical components of the incinerator may be operated on a 118 volt, 60 cycle, single phase 1750 watt power supply. The vent through the wall from the incinerator should be adapted to handle 110 c.f.m. at 110° F. and 0.6 inch $H_2O$ static maximum. The capacity of the incinerator is approximately 1½ bushels of waste which may be incinerated in an automatic time cycle of approximately five to six hours. Typical temperatures occurring in the chambers 42 and 72 and in the exhaust from blower outlet 27 during either a small load or a large load are shown in the graphs of FIGURES 14 and 15.

While the embodiments of the present invention as herein disclosed, constitute preferred forms, it is to be understood that other forms might be adopted.

What is claimed is as follows:

1. In combination, a waste incinerator having casing means defining an air-tight destructive distillation chamber and a combustion chamber interconnected with said distillation chamber, heater means for said distillation chamber, first duct means for supplying oxidation air to said combustion chamber, second duct means openable for supplying oxidation air to said distillation chamber and closable for maintaining said distillation chamber air-tight, common catalyst means for said combustion chamber and said distillation chamber and in thermal heat exchange relation with said chambers, means thermally responsive to temperatures in said distillation chamber and said combustion chamber by way of said catalyst means for energizing said heater means to control the distillation of said waste, and means connected to said first duct means through said combustion chamber for cooling said oxidized products of distillation and for maintaining said distillation chamber under a negative pressure during the distillation of said waste when said second duct means is closed and connected to said second duct means through said combustion and distillation chambers for supporting oxidation of any carbonaceous residue remaining in said distillation chamber after the distillation of said waste when said second duct means is open.

2. In combination, a waste incinerator having casing means defining an air-tight destructive distillation chamber and a combustion chamber interconnected with said distillation chamber, heater means for said distillation chamber, means for supplying oxidation air to said combustion chamber, catalyst means for said combustion chamber and said distillation chamber and in thermal heat exchange relation with said chambers, means thermally responsive to temperatures in said distillation chamber and said combustion chamber by way of said catalyst means for energizing said heater means to control the distillation of said waste, and means for cooling said oxidized products of distillation and for maintaining said distillation chamber under a negative pressure during the distillation of said waste and for supporting oxidation of any carbonaceous residue remaining in said distillation chamber after the distillation of said waste.

3. The combination of claim 2 wherein said last named means includes a fan having an inlet in communication with the atmosphere for drawing in dilution air and in communication with said combustion chamber for withdrawing oxidized products of distillation during the distillation of waste, said fan having an outlet for exhausting the mixture of said dilution air and said oxidized products of distillation at temperatures relatively cooler than said oxidized products of distillation, and wherein said last-named means includes means operable to place the inlet of said fan at least partially in communication indirectly with the atmosphere through said distillation chamber after the distillation of said waste whereby oxidation air is drawn into said distillation chamber for supporting oxidation of said carbonaceous residue.

4. In an incinerating appliance for installation in a kitchen or the like and having a casing defining a substantially air-tight chamber, an access door movable for loading said chamber, means including a catalyst in communication with said chamber for eliminating free oxygen from said chamber, and means including heating means for said chamber and temperature responsive means selectively controlling said heating means for causing destructive distillation of waste in said chamber thereby to control the rate of destructive distillation of said waste in the absence of said free oxygen, said catalyst eliminating smoke and odor from the products of said destructive distillation of waste.

5. In an incinerating appliance for installation in a kitchen or the like and having a casing defining a substantially air-tight chamber, an access door movable for loading said chamber, means including a catalyst in communication with said chamber for eliminating free oxygen and for altering effluent from said chamber to a substantially colorless and odorless product, means including heating means in said chamber and temperature responsive means selectively controlling said heating means for causing destructive distillation of waste in said chamber thereby to control the rate of destructive distillation of said waste in the absence of said free oxygen, and means for heating the jointure between said access door and said casing when said access door is closed for minimizing condensation at said jointure at the start of said destructive distillation of waste.

6. In combination, an appliance for incinerating waste and having a casing defining a substantially air-tight destructive distillation chamber having an access opening and a selectively openable air passage, an access door closing said opening and movable to an open position for loading said chamber, means including a catalyst in communication with said chamber for eliminating any free oxygen from said chamber, means including a heating means for selectively controlling the rate of destructive distillation of said waste in said chamber in the absence of said free oxygen, and means for eliminating the products of said distillation, said last named means including a fan having an inlet in continuous communication with the atmosphere for drawing in dilution air and in continuous communication with said distillation chamber for withdrawing said products of distillation when said fan is operating and said access door is closing said opening, said fan having an outlet for exhausting the mixture of said dilution air and said products of distillation at temperatures relatively cooler than said products of distillation, said fan being in communication with said air passage and operable whenever said access door is in said open position and said air passage is open to effect a sweep of air through said chamber from said access opening through said air passage to said outlet thereby to prevent contaminants from leaving said chamber through said opening.

7. In an appliance for installation in a kitchen and having a casing defining a substantially air-tight chamber, an access door movable for loading said chamber, means including a catalyst in communication with said chamber for eliminating any free oxygen from said chamber, means including heating means in said chamber and temperature responsive means selectively controlling said heating means for causing destructive distillation of waste in said chamber thereby to control the rate of destructive distillation of said waste in the absence of said free oxygen, means for heating the jointure between said access door and said casing when said access door is closed for minimizing condensation at said jointure at the start of said destructive distillation of waste, and door latch means controllable when said access door is closed to prevent opening said access door, temperature responsive means selectively controlling said door latch means to prevent the access door from being opened while temperatures in said chamber are above a predetermined value.

8. A method for incinerating waste comprising the steps of confining the waste in a substantially air-tight manner, eliminating free oxygen in communication with said waste, selectively heating said waste to destructively distill said waste substantially in the absence of free oxygen, temperature responsively controlling said heating to maintain said waste at a predetermined temperature until said waste is reduced to a carbonaceous residue, and supplying oxygen to said carbonaceous residue to oxidize said residue to an ash.

9. A method for incinerating waste comprising the steps of confining the waste in a substantially air-tight manner, catalytically eliminating free oxygen in communication with said waste, selectively heating said waste to destructively distill said waste substantially in the absence of free oxygen until said waste is reduced to a carbonaceous residue, and supplying oxygen to said carbonaceous residue to oxidize said residue to an ash.

10. In combination with a waste incinerator having a substantially air-tight distillation chamber and heater means in said chamber for regulating the sequential distillation of said waste and the burning of any carbonaceous residue resulting therefrom, means for controlling said heater means to initiate and regulate the rate of said distillation, and means including means operable substantially when the regulation of said distillation is terminated for facilitating the passage of air to said chamber for supporting the burning of any carbonaceous residue remaining in said chamber after said distillation.

11. The combination of claim 10 wherein said controlling means includes timer operated switch means and thermally operated switch means at least partially responsive to temperatures in said chamber and in series with said timer operated switch means.

12. The combination of claim 10 including means in control relationship to said last named means and thermally responsive to the temperatures outside said chamber resulting from said burning for terminating said passage of air after the completion of said burning.

13. In combination with a waste incinerator having a substantially air-tight distillation chamber and heater means in said chamber for maintaining the rate of said distillation, a control circuit including a timer for sequentially controlling said incinerator to initiate and terminate a distillation cycle, means in said circuit thermally responsive to temperatures in said chamber for selectively energizing said heater means during said distillation cycle, and means controllable by said timer after the termination of said distillation cycle to admit air into said chamber for supporting the burning of any carbonaceous residue remaining in said chamber after said distillation cycle.

14. The combination of claim 13 including a catalytic oxidizing chamber in communication with said chamber and a blower in communication with said air admitting means through said oxidizing chamber and said distillation chamber for withdrawing the oxidized products of distillation and burning from said chambers.

15. The combination of claim 13 including a catalytic oxidizing chamber in communication with said chamber and a blower in communication with said air admitting means through said oxidizing chamber and said distillation chamber for wtihdrawing the oxidized products of distillation and burning from said chambers and in communication with the atmosphere for diluting the withdrawn oxidized products of combustion.

16. The combination of claim 15 including means thermally responsive to the diluted oxidized products of combustion for terminating the operation of said blower below a predetermined temperature level.

References Cited by the Examiner
UNITED STATES PATENTS

| | | | |
|---|---|---|---|
| 395,807 | 1/1889 | Bliss | 110—11 |
| 1,134,512 | 4/1915 | Carr | 110—11 |
| 2,763,760 | 9/1956 | Buckle | 110—18 |
| 2,914,059 | 11/1959 | Eddison | 110—14 X |
| 2,993,843 | 7/1961 | Lantz | 110—11 X |
| 3,150,619 | 7/1964 | Brucker et al. | 110—8 |

FREDERICK L. MATTESON, JR., *Primary Examiner.*

H. B. RAMEY, *Assistant Examiner.*